Oct. 29, 1957     J. G. BRADLEY     2,811,423
REDISTRIBUTOR FOR LIQUID-LIQUID EXTRACTION COLUMNS
Filed June 22, 1955     2 Sheets-Sheet 1
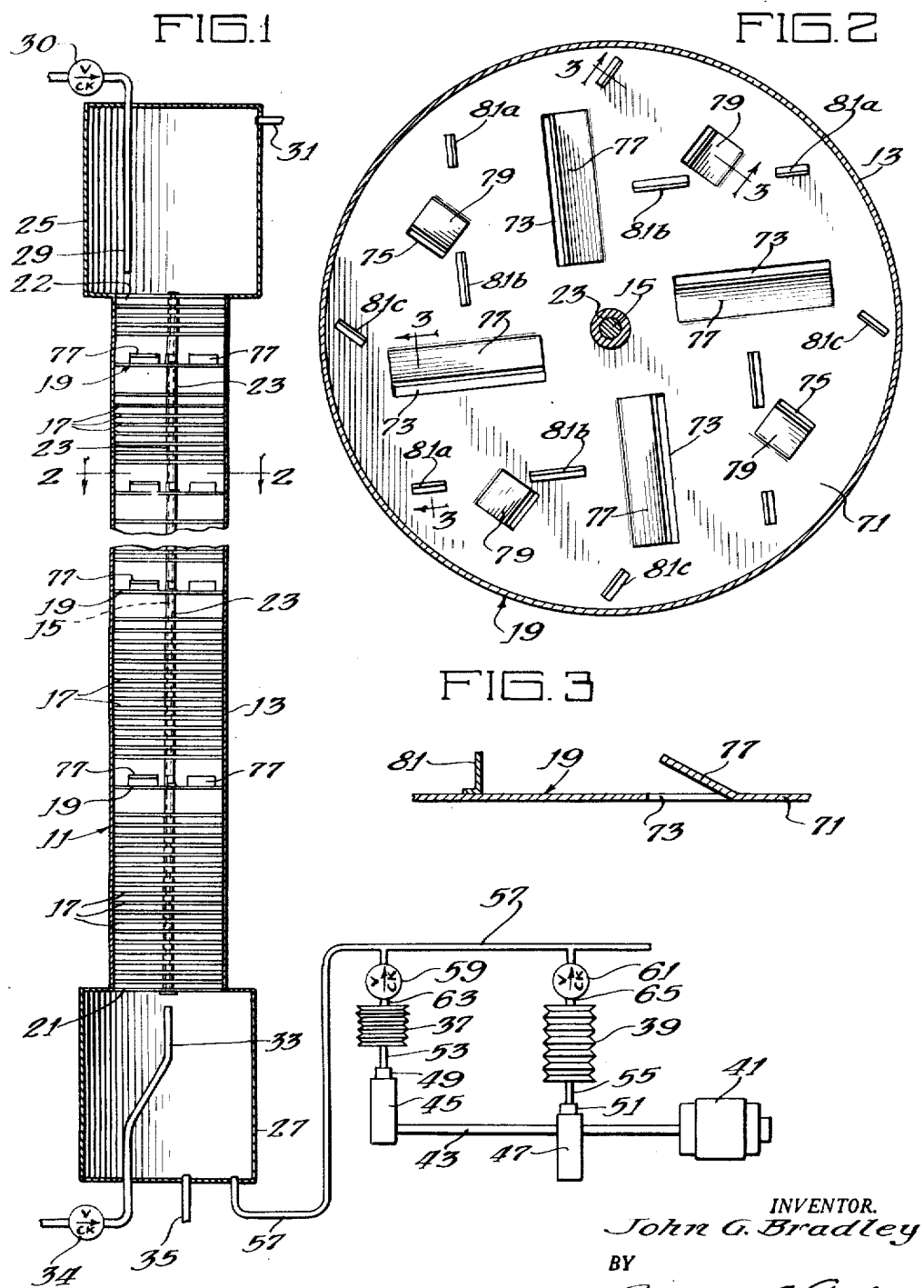
INVENTOR.
John G. Bradley
BY
Roland A. Anderson
Attorney.

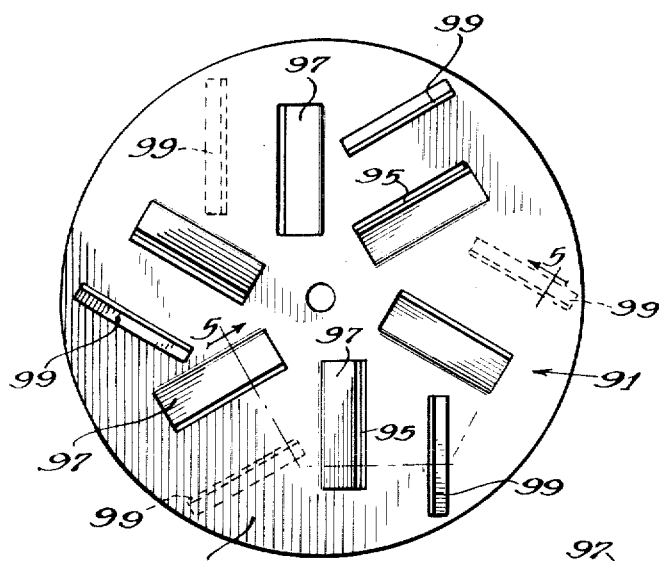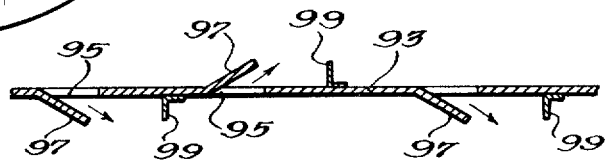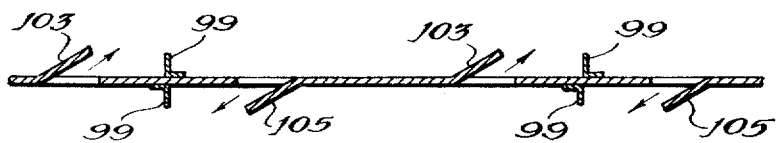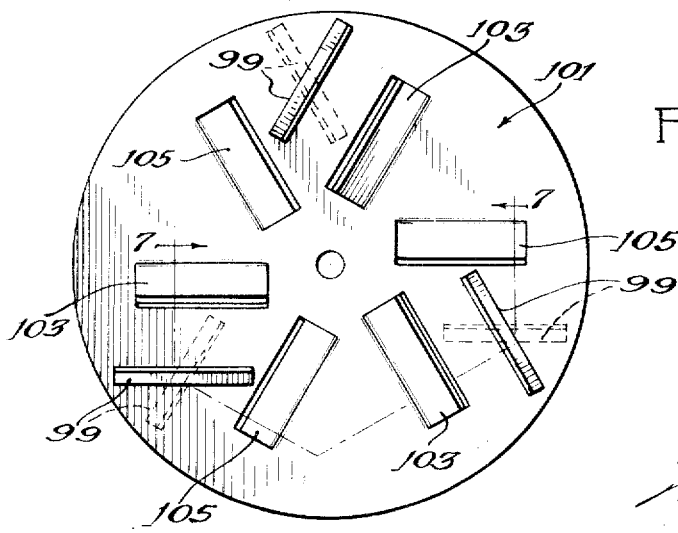

United States Patent Office 2,811,423
Patented Oct. 29, 1957

2,811,423
REDISTRIBUTOR FOR LIQUID-LIQUID EXTRACTION COLUMNS

John G. Bradley, Richland, Wash., assignor to the United States of America as represented by the United States Atomic Energy Commission Application June 22, 1955, Serial No. 517,404

1 Claim. (Cl. 23—270.5)

This invention relates to improvements in apparatus adapted to intimately mix immiscible liquid solvents for solvent extraction processes; more particularly it relates to improved baffle plate construction for liquid-liquid pulse columns.

In certain chemical processes it is necessary to extract a chemical substance dissolved in a first liquid solvent into a second solvent. This operation can be readily carried out in apparatus generally termed pulse column extractors. A pulse column comprises a substantially vertical tank or column having a heavy liquid inlet at the top, and a heavy liquid outlet at the bottom of the column; a light fluid inlet at the bottom, and a light liquid outlet at the top of the column; suitable baffle plates disposed within the column and pumping apparatus to periodically induce a pressure pulse in the column and adapted to urge the countercurrent flow of the two liquid solvents. In such an apparatus the two liquid phases flow countercurrently through the tank by reason of the difference in density of the two liquids. An aqueous solvent and an organic hydrocarbon solvent are frequently utilized as the two immiscible liquid solvents. Each pressure pulse draws small quantities of the solvents into the tank at the inlets and forces small quantities of the solvents out of the tank at the respective outlets. To further enhance the intimate mixing of the two liquid solvents, perforated disk sieve baffle plates are disposed within the tank transversely to the direction of fluid flow.

The efficiency of the extraction process in a pulse column is related to the completeness of mixing of the two solvents. Complete mixing in pulse columns is prevented by a condition termed "channeling" wherein the light liquid and a heavy liquid form separate continuous homogeneous vertical channels through sections of the column or even throughout the full height of the column; the liquid solvents flow along these homogeneous channels without mixing with the counterflowing liquid.

One object of the present invention is to provide an improved pulse column not subject to homogeneous channeled flow of the liquid solvents within the mixing tank.

Another object of the invention is to provide a baffle plate construction readily adaptable to installation in existing pulse column extractors which will inhibit and prevent homogeneous channel flow within the column.

These and other objects and advantages of the invention will be evident from the following drawings, specifications, and claims.

My invention is, briefly, an improved pulse column redistributor baffle plate adapted to inhibit and eliminate homogeneous channeling in a pulse column, comprising a flat plate having openings through the plate, and louvers disposed at acute angles to the plate surfaces and adjacent to the openings whereby a motion having a tangential component with respect to the plate surfaces is imparted to liquids flowing through the baffle plate openings.

Specific embodiments of my invention are disclosed in the following specification and illustrations in which:

Fig. 1 is a cross-sectional view of a pulse column extractor;

Fig. 2 is a plan sectional view of one embodiment of my novel baffle plate taken along line 2—2 of Fig. 1;

Fig. 3 is a sectional view of the embodiment of my novel baffle plate of Fig. 2 taken along line 3—3;

Fig. 4 is a plan view of a second embodiment of my invention;

Fig. 5 is a cross-sectional view of the embodiment shown in Fig. 4 taken along the broken line 5—5;

Fig. 6 is a plan view of still another embodiment of my invention; and

Fig. 7 is a cross-sectional view of the embodiment of Fig. 6 taken along the broken line 7—7.

Referring to Fig. 1 wherein a cross-sectional view of a typical pulse column extractor containing the redistributor plates of the present invention is illustrated, the reference numeral 11 refers to a vertical mixing column comprised of a cylindrical tank shell 13, a supporting shaft 15 disposed vertically along the axis of the cylindrical tank and adapted to support a plurality of sieve plates 17, and a plurality of redistributor baffle plates 19. Figs. 2 and 3 illustrate one embodiment of my novel redistributor baffle plate, which is the embodiment illustrated in Fig. 1 indicated by reference numeral 19. The shaft 15 passes from the lowermost wall 21 of the tank shell 13, to the uppermost wall 22; both end walls 21 and 22 are perforated and readily removable from the shell 13 to allow access to sieve plates 17 and the baffle plates 19. The sieve plates 17 and the redistributor baffle plates 19 are supported on the shaft 15 and spaced by means of sleeve spacers 23 which are shown assembled concentrically on the shaft 15 between the various sieve plates 17 and the redistributor baffle plates 19.

A light-liquid collection chamber 25 is positioned immediately above and continuous with the tank shell 13. A heavy-liquid collection chamber 27 also continuous with the tank shell 13 is positioned immediately therebelow. Heavy-liquid solvents are introduced through a heavy-liquid inlet pipe 29 having a pressure check valve 30; the inlet pipe 29 terminates in the lower portion of the light-liquid collection chamber 25. Light liquid is removed from the column through the light-liquid outlet pipe 31 which taps into the upper portion of the light-liquid collection chamber 25. A light-liquid inlet pipe 33 having a pressure check valve 34 terminates in the upper portion of the heavy-liquid collection chamber 27; heavy liquid is drawn off through the heavy-liquid outlet pipe 35 which taps into the lower portion of the heavy-liquid collection chamber 27.

Means for inducing pressure pulses within the column 11 are illustrated in schematic form in Fig. 1. Two bellows pumps 37 and 39 are powered by a variable speed motor 41 which is connected to the bellows by means of a shaft 43, two eccentric cams 45 and 47 mounted on the shaft, cam followers 49 and 51 and connecting rods 53 and 55. The cams 45 and 47 are mounted on the shaft 43 with their axes of eccentricity positioned on the shaft so that bellows 37 and 39 will be alternately compressed and expanded out of phase. The bellows 37 and 39 are connected to the column 11 through connectors 63 and 65 and a common pulse transmission line 57 which terminates within the heavy-liquid collection chamber 27. Pressure check valves 59 and 61 are disposed in connectors 63 and 65, between the bellows and the pulse transmission line 57, and serve to further heighten the abruptness of the pressure pulses within the column 11. The speed of the shaft 43 may be adjusted from 10 R. P. M. to 200 R. P. M. and upwardly. The bellows may be cycled with a deep or a shallow stroke by adjustment of the eccentricity of the cams 45 and 47. Accordingly, the frequency, the magnitude, and the phase of the pressure pulses may be readily adapted to any desired combination of values within wide limits suitable for conventional pulse column extractions.

The sieve plates 17, seen in cross-sectional view in Fig. 1 are flat metal plates perforated with a plurality of small holes passing straight through from one side to the other; the relative area of the openings in the sieve plates may be varied to suit the requirements of any conventional column extractor; and in practice are found to range from 15% to 70%. The particular sieve plates 17 illustrated in Fig. 1 are ⅛" thick stainless steel plates having 23% open area comprised of ⅛" diameter holes, spaced two inches apart measured from plate surface to plate surface.

The louvered redistributor baffle plates 19 of the present invention are adapted to be positioned within the pulse column at appropriately spaced intervals to disrupt "channeled" flow through the stacked sieve plates 17. One embodiment of my louvered redistributor baffle plate, illustrated in Figs. 1, 2, and 3, comprises broadly a corrosion resistant flat metal plate 71, having parallel surfaces and having a plurality of rectangular openings 73 and square openings 75 through the plate 71. The openings are arranged so that one edge of each of the square openings 73, and one edge of the longer sides of the rectangular openings 75 are on a radius drawn from the center of the plate 71. Both openings 73 and 75 are provided with a straight plane louver 77 or 79 joined to the surface of the plate along one edge of the opening and projecting over the respective opening at an angle with the surface of the plate 71. Deflection baffles 81a, 81b, and 81c are associated with each opening 73 and 75 and are attached to the plate 71. Each deflection baffle is perpendicular to the redistributor plate surface and spaced a suitable distance from the open side of its respective louver. Suitable spacing ranges from 1 inch to 7 inches depending upon the diameter of the column and other parameters of the extraction process. In the specific embodiment illustrated in Fig. 2 the deflection baffles or plates 81a and 81b are spaced 4½ inches from the open end of the louver 77; and the deflection plate 81c is spaced 4 inches from the open ends of the louvers 79.

The louvers 77 and 79 are disposed to open upwardly and counterclockwise in the embodiment illustrated in Figs. 1, 2, and 3, and accordingly the primary effect of the louvers is on the lighter fluid. The redistributor plates are spaced in the column 11, which in the illustrated example is 13.5 feet long at intervals of 14, 40, 80 and 129 inches below the uppermost tank wall 22. Sieve plates 17 are removed from a 6 inch section of the column just above and just below the redistributor plates 19. The percent of total openings in the redistributor plates may be varied between 10 and 50 percent; the angle of the louvers may be varied from 5 degrees to 70 degrees; the height of the vertical deflection plates 81a, 81b, and 81c may be varied from zero or no deflection to 5 inches; the diameter of the redistributor plates 19 is sufficiently large to fit snugly within the interior of the column substantially free of leaks about the periphery. The present invention may be used in columns of any diameter in which "channeling" is a problem; the column illustrated in Fig. 1 is 23.5 inches in inside diameter, accordingly the redistributor plates 19 are 23.5 inches in diameter. In the illustrated embodiment of Fig. 2 the openings 73 and 75 comprise 15% of the area of the redistributor plate 71; the louvers 77 and 79 are disposed over the openings at a 30 degree angle with the surface of the plate 71; the vertical deflection plates 81a, 81b, and 81c are 2 inches high.

Figs. 4 and 5 illustrate an alternative redistributor baffle plate 91 suitable for substitution in place of plates 19 in the pulse column illustrated in Fig. 1 or in any other conventional column extractor. The redistributor plate 91 is comprised of a corrosion resistant metal plate 93 having rectangular openings 95 arrayed in a radial pattern about the plate center and comprising between 10 and 50 percent of the plate area; louvers 97 are fastened to the plate 93 along the edges of openings 95 and disposed on alternate openings above and below the plate 93. All the louvers 97 are disposed to open clockwise about the center of the plate. Vertical deflection plates 99 are associated with each opening 95 and disposed adjacent to the open end of the respective louvers 97. The louvered openings disposed as specified above induce a counterclockwise rotation of both the descending heavy liquid and the ascending light liquid flowing therethrough.

Figs. 6 and 7 illustrate still another embodiment of my novel redistributor baffle plates, which is in all details similar to the redistributor plate 91 of Fig. 4 except that in the embodiment of Figs. 6 and 7 the louvers indicated by the reference numerals 103 and 105 are disposed along the edges of the rectangular openings 106 and 107 alternately on a first side 108 and then on a second side 110 opposite the first side 108 of a plate 101; the first side louvers 103 are disposed to open counterclockwise about the center of the plate 101 and the second side louvers 105 are disposed to open in a clockwise direction about the center of the redistributor plate 101. In this embodiment the two immiscible liquids are caused to rotate countercurrently through one another; the descending heavier liquid being rotated clockwise, and the ascending lighter liquid being rotated counterclockwise.

EXPERIMENTAL RESULTS

Redistributor baffle plates constructed according to my novel inventive design and installed in appropriate pulse column extractors have been successfully tested in uranium extraction processes and have reduced uranium losses from 6% to less than 0.001% under the conditions described below.

The performance data tabulated below in Tables I and II relates to a uranium extraction process wherein 0.8 M uranyl nitrate aqueous (heavy phase) solution in 2.4 M nitric acid is stripped by intimate mixing in countercurrent flow of an organic extractant (light phase) comprising 30 volume percent tributyl phosphate (TBP) diluted with a refined kerosene-type hydrocarbon (Shell Deodorized Spray Base, specific gravity=0.788). The organic-to-aqueous phase volume flow ratio was approximately 2.4, the aqueous being the continuous phase. The theoretical extractant flow requirement was at a maximum at the concentrated (top) end, where only approximately 40% excess extractant flow was available with the solvent-to-feed ratio used.

The process was carried out in the pulse column extractor illustrated in Fig. 1. In Table I below data is presented indicating performance of the pulse column operated without redistributor baffle plates which was the conventional practice prior to the present invention; and also data is presented indicating the performance of the same column operated with the embodiment of my novel louvered redistritutor baffle plates illustrated in Figs. 2 and 3. Table I compares data indicating the percent of uranium loss and the Height of Transfer Unit (HTU) for the above uranium stripping process carried on without redistributor baffle plates with data obtained for the same process carried on with redistributor baffle plates. The Height of Transfer Unit (HTU) refers to a single length dimension characteristic of the height of apparatus required to accomplish a separation of standard difficulty. Complete derivation of the HTU may be found in Perry, J. H., Chemical Engineers Handbook, 3d edition, pages 550–553, 744–746, McGraw-Hill Book Co., Inc., New York, 1950. A pulse amplitude measured from one extreme position to the other of 0.9 inch was employed throughout the tests. The volume flow of the processes tabulated in Table I was approximately 600 gallons per hour per square foot of column cross section, sum of both phases.

The pulse column dimensions are as follows: 23.5 inches inside diameter, 13.5 feet column height, sieve plate separation 2 inches plate surface-to-plate surface. The sieve plates were ⅛" thick stainless steel having ⅛" diameter holes comprising 23% of the total plate area. The louvered redistributor plates employed in the test processes reported here comprised ⅛" thick stainless steel plates having 15% open area as specified above and illustrated in Fig. 1. All louvers were at a 30 degree angle with the plate surface, extended upwardly, and opened clockwise. The louvered redistributor plates were spaced from the top of the column at distances of 14, 40, 80 and 120 inches respectively; all sieve plates were removed from a space 6 inches above and 6 inches below the louvered redistributor plates.

Table I.—*Effective of redistributor baffle plate or uranium loss in 23.5 inch diameter pulse column*

| Frequencies, Cycles/min. | Without Redistributor | | With Redistributor | |
|---|---|---|---|---|
| | Percent Uranium Loss | HTU in ft. | Percent Uranium Loss | HTU, ft. |
| 40 | 11 | 5.9 | 0.06 | 1.9 |
| 60 | 6 | 4.8 | 0.001 | 1.2 |
| 70 | 6 | 4.8 | 0.001 | 1.2 |

The data of Table I clearly indicates the superiority of the performance attainable with inclusion of the novel louvered redistributor plates of the present invention in pulse column extractors. At forty cycles per minute uranium losses without louvered redistributor plates in the pulse column were 11% and the HTU was 5.9 feet. However, with the inclusion of the louvered redistributor plates as specified above the uranium losses were reduced to .06% and the HTU to 1.9 feet. At higher pulse frequencies similar remarkable performance improvements can be obtained.

Table II tabulates data showing the effect of varying throughput rate on uranium losses in the pulse column described above in connection with the data of Table I and operated with my redistributor baffle plates such as illustrated in Figs. 2 and 3 suitably disposed within the column. It may be noted that varying the volume velocity of the liquid phases does not noticeably alter the percent of uranium loss or the HTU required to maintain efficient extraction.

Table II.—*Effective of throughput rate on uranium loss with redistributors in 23.5 inch diameter column*

| Vol. Velocity, Gal./Sq. Ft. Column Cross-section | Relative throughput Rate | Frequency, Cycles/min. | Percent Uranium Loss | HTU, feet |
|---|---|---|---|---|
| 200 | 1 | 70 | 0.001 | 1.2 |
| 600 | 3 | 60 | 0.001 | 1.2 |
| 800 | 4 | 60 | 0.006 | 1.4 |
| 1100 | 5.5 | 60 | 0.001 | 1.2 |

Aside from the quantitative data presented above, columns similar to that illustrated in Fig. 1 have been prepared with viewing windows in the column walls and with apparatus for sampling the condition of the liquids at various regions in the column; with these latter techniques, the degree of "channeling" is readily observed by direct methods. In all instances when suitable louvered redistributor baffle plates have been appropriately disposed within the extraction columns channeling has been eliminated or reduced to negligible consequences and operating characteristics markedly improved. In such instances observations through the viewing windows and analysis of samples obtained from test outlets installed in various regions of the columns bear out the conclusion that installation of my louvered redistributor baffle plates in pulse column extractors effectively eliminates channel flow within the column. While the redistributor plates are particularly useful in pulse columns it will also be apparent that they can be used in other liquid-liquid column extractors which are not pulsed.

It is intended that the present invention not be limited by the specifications above which are purely illustrative but are to be limited only by the following claim.

What is claimed:

In a pulse column for mingling and later separating immiscible liquids of differing densities, a baffle having first and second parallel surfaces disposed normally to the axis of the column, and having a plurality of rectangular oblong louvered openings located about the center of the baffle in a generally radial pattern, the louvered openings being alternately opened away from the first and the second surfaces of the baffle and being alternately opened clockwise and counterclockwise as a circular path about the center of the baffle is traversed, the louvered openings thus imparting a clockwise motion to liquid passing through the openings in the direction of the first to the second parallel surface and a counterclockwise motion to liquid passing in the direction of the second to the first parallel surface, said baffle further having for each louvered opening a deflection plate attached and disposed normally to a surface of the baffle, the deflection plates for the louvered openings being positioned on the baffle to intercept and disperse liquid which has been directed toward and thrust against the deflection plates upon being forced through and given direction by their respective louvered openings.

References Cited in the file of this patent

UNITED STATES PATENTS

| 2,568,749 | Kittel | Sept. 25, 1951 |
| 2,662,001 | Burns et al. | Dec. 8, 1953 |

FOREIGN PATENTS

| 552,963 | Germany | June 20, 1932 |
| 669,862 | Great Britain | Apr. 9, 1952 |

UNITED STATES PATENT OFFICE

CERTIFICATE OF CORRECTION

Patent No. 2,811,423                                                             October 29, 1957

John G. Bradley

It is hereby certified that error appears in the printed specification of the above numbered patent requiring correction and that the said Letters Patent should read as corrected below.

Column 3, line 49, for "129 inches" read -- 120 inches --; column 5, line 15, Table I, in the heading, for "Effective", in italics, read -- Effect -- in italics; same line, for "or", in italics, read -- on -- in italics; line 49, Table II, in the heading, for "Effective", in italics, read -- Effect -- in italics.

Signed and sealed this 16th day of June 1959.

(SEAL)
Attest:

KARL H. AXLINE                                               ROBERT C. WATSON
Attesting Officer                                        Commissioner of Patents